June 30, 1959
J. MERCIER
2,892,310
AUTOMATIC FOLLOW-UP SYSTEM FOR SUCCESSIVE
APPLICATION OF POWER SOURCES
Filed Feb. 17, 1954
3 Sheets-Sheet 1
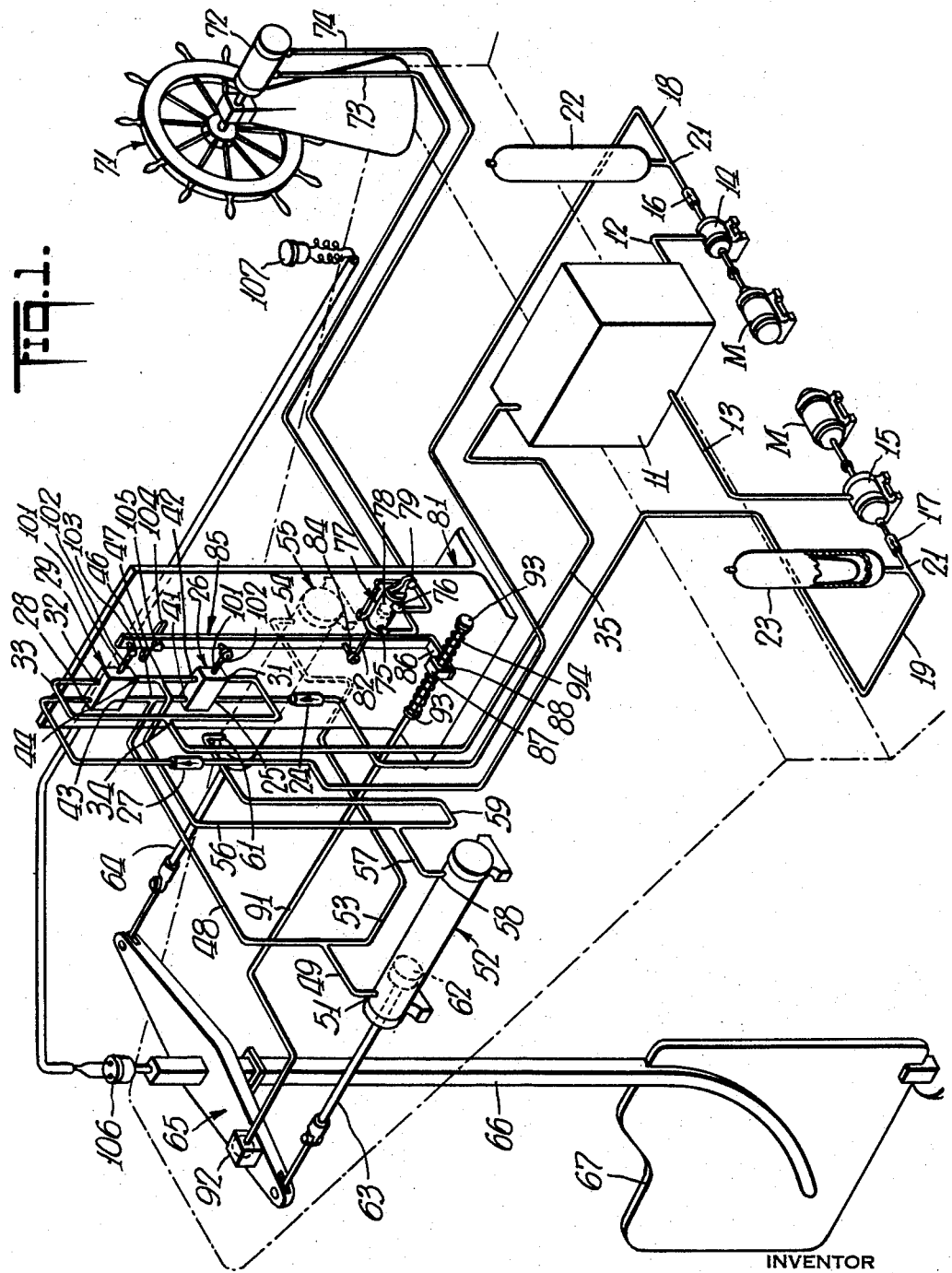
INVENTOR
*Jean Mercier*
BY
*Dean Fairbank & Hirsch*
ATTORNEYS

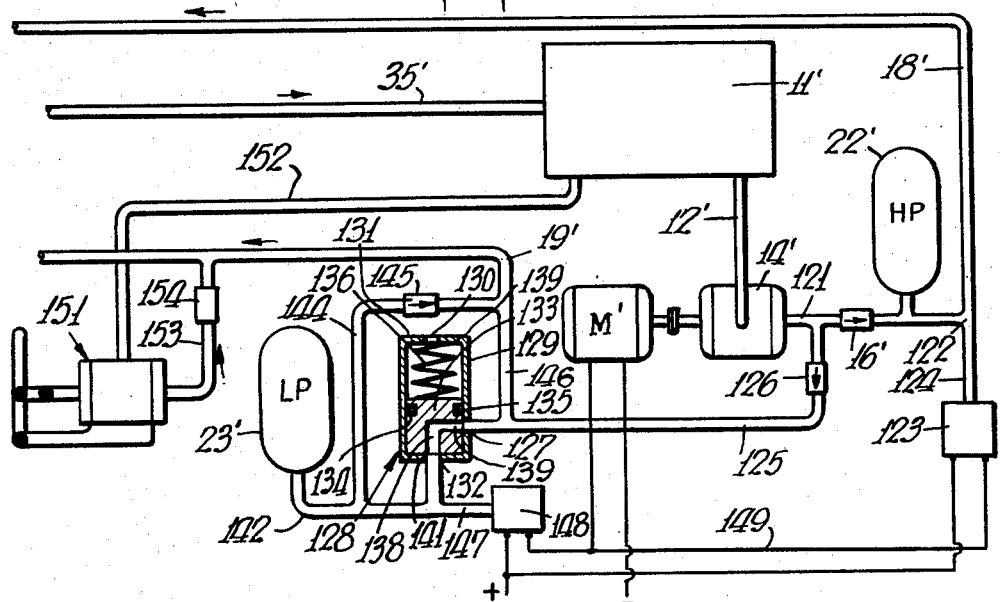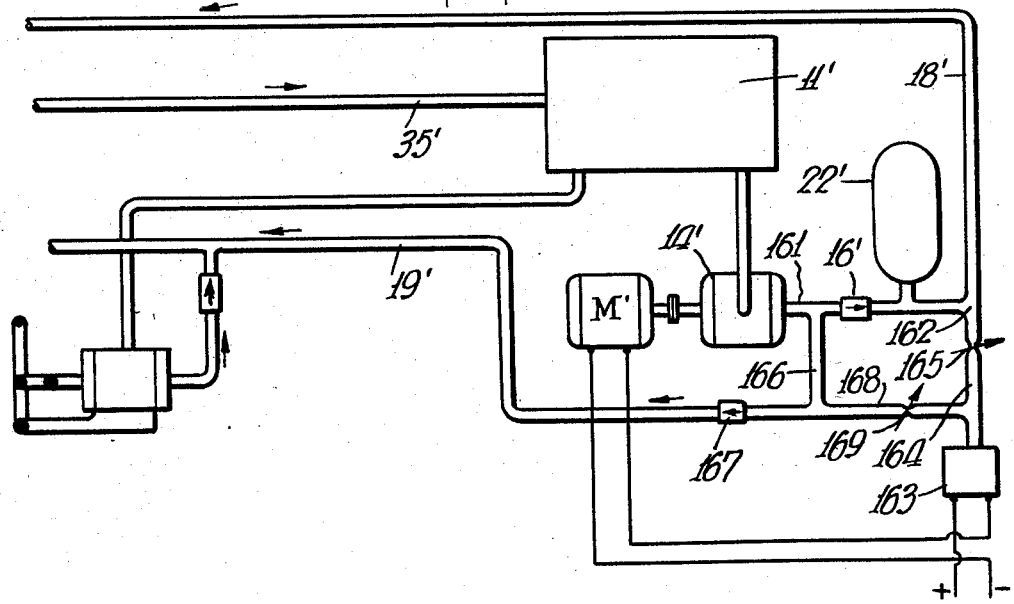

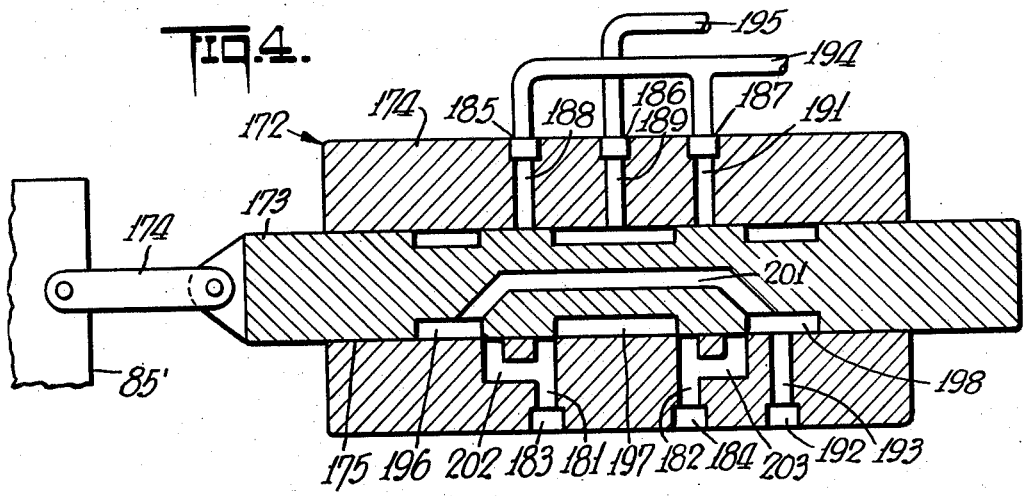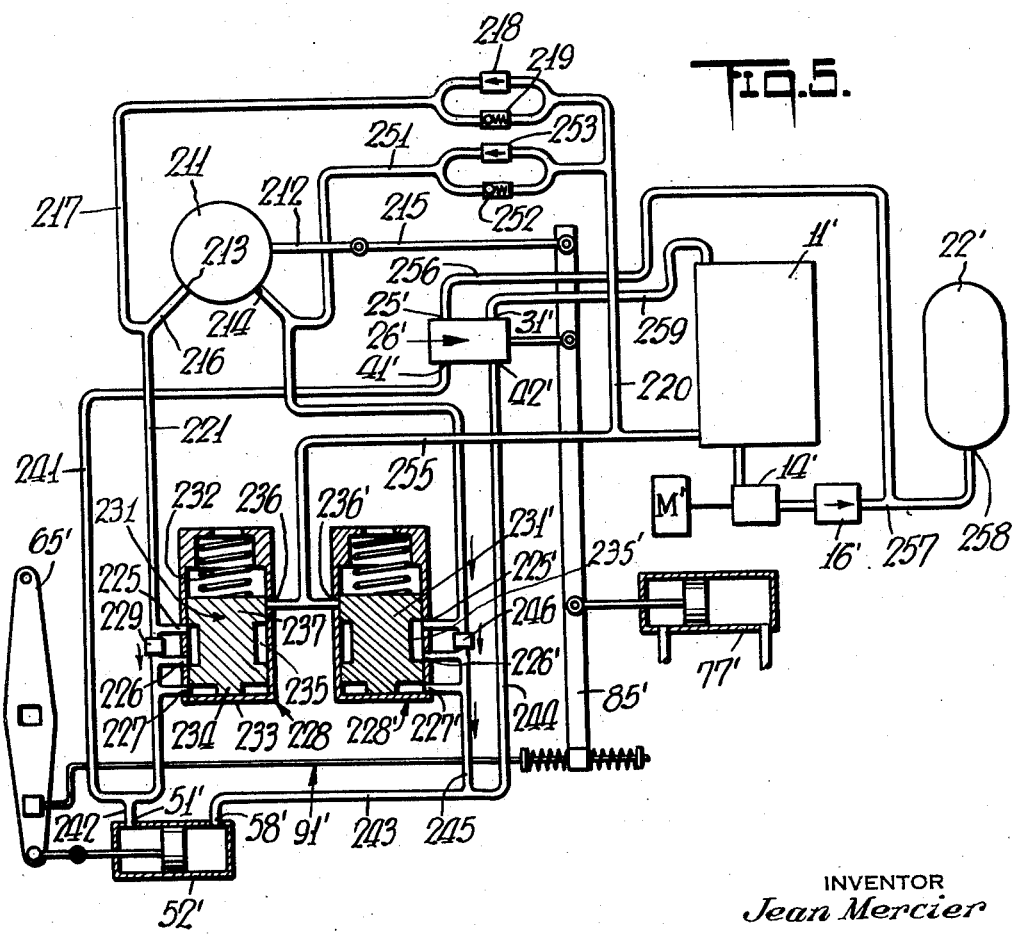

United States Patent Office 2,892,310
Patented June 30, 1959

2,892,310

AUTOMATIC FOLLOW-UP SYSTEM FOR SUCCESSIVE APPLICATION OF POWER SOURCES

Jean Mercier, New York, N.Y.

Application February 17, 1954, Serial No. 410,956

14 Claims. (Cl. 60—51)

This invention relates to the art of hydraulic follow-up systems and more particularly to the control for effecting the angular shift of a movable member.

As conducive to an understanding of the invention it is noted that to keep a vessel on a given head or direction, only relatively small and slow angular displacement is required of the rudder, on either side of a neutral position, which requires but relatively low power. To change direction of the vessel rapidly and a considerable amount, which occurs only infrequently, a corresponding rapid, extensive angular displacement of the rudder must be effected, which requires relatively high power, and such high power is also required when the movement of the rudder is impeded, such as by the force of the waves thereagainst or the resistance of the water against ready displacement of the rudder which increases with the speed of the vessel.

Where a hydraulic system is provided with a single source of fluid under pressure to perform both of said functions, although only a relatively low pressure source is normally required to effect the usual displacement of the rudder, the system would have to be a high pressure system to provide the occasional high pressure fluid required, with the resultant need for considerable power.

It is accordingly among the objects of the invention to provide a hydraulic follow-up system which is relatively simple in construction and is not likely to become deranged and which provides both a low and high pressure source of fluid and will automatically and dependably switch the high pressure source into and out of operation as required, with consequent economy in power consumption.

According to the invention, fluid under a relatively low pressure is available to effect normal operation of a movable member such as a rudder controlled by a steering wheel. In the event that the phase difference between the positions of the rudder and steering wheel should exceed a predetermined amount, a source of fluid under a relatively high pressure will be connected to operate the rudder and such source of fluid under high pressure will be cut off when the phase difference has been reduced to a predetermined amount.

In the accompanying drawings in which are shown one or more of various possible embodiments of the several features of the invention, Fig. 1 is a perspective view of a rudder control system, and Figs. 2 to 5 inclusive are diagrammatic views of other embodiments of the system.

This application is a continuation-in-part of copending application Serial No. 297,461, filed July 7, 1952, now Patent No. 2,791,092, dated May 7, 1957.

Referring now to the drawings, the system shown in Fig. 1 desirably comprises a reservoir 11 connected by lines 12 and 13 to pumps 14 and 15 respectively, each driven by an associated motor M. The outlets of said pumps are connected through associated one-way valves 16 and 17 to feed lines 18 and 19 respectively. Connected to each of the feed lines as at 21 are pressure accumulators 22 and 23 respectively, desirably of the type put out by Greer Hydraulics, Inc. of Brooklyn, New York.

The feed line 18, which is the high pressure line, is connected through one-way valve 24 to the inlet port 25 of selector valve 26 and the feed line 19, which is the low pressure line, is connected through one-way valve 27 to the inlet port 28 of a selector valve 29. The selector valves are of the conventional three-way type, having a neutral position in which all ports are closed and two operating positions. The selector valves 26 and 29 have discharge ports 31 and 32 respectively connected by lines 33 to junction 34 and such junction is connected by return line 35 to the reservoir 11.

Each of the selector valves 26, 29 also has two control ports 41, 42, and 43, 44 respectively, the ports 41, 43 and 42, 44 being in communication respectively and connected to junctions 46 and 47. Junction 46 is connected by lines 48 and 49 to the port 51 of a hydraulic cylinder 52 and by lines 48 and 53 to the port 54 of a second hydraulic cylinder 55. Junction 47 is connected by lines 56 and 57 to the port 58 of the hydraulic cylinder 52 and by lines 56 and 59 to the port 61 of the hydraulic cylinder 55.

Each of the hydraulic cylinders has a piston 62 slidably mounted therein, the two ports of each of the cylinders being positioned respectively on opposed sides of the associated piston.

Affixed at one end to each of the pistons 62 is a piston rod 63 and 64 respectively, the outer end of which is connected by suitable linkage to the end of a cross bar 65 which is rigidly connected to the shaft 66 of a rudder 67.

In the illustrative embodiment, the rudder is desirably controlled by a steering wheel 71 which may be located at some remote position as on the deck of a ship. The steering wheel when rotated in a clockwise or counterclockwise direction, actuates a pump 72 which forces fluid under pressure through either the lines 73 or 74 depending upon the direction of rotation of the wheel. Lines 73 and 74 are connected respectively to the ports 75 and 76 of a hydraulic cylinder 77, said ports being positioned on opposed sides of a piston 78, slidably mounted in said cylinder. The cylinder, as illustratively shown in the drawings, is pivotally mounted at its rear end as at 79 on a suitable support 81 and has a piston rod 82 which is affixed at one end to the piston 78 and pivotally connected at its other end to a pin 84 extending laterally outward from an upright control lever 85. The lower end of the lever 85 desirably has a laterally extending leg 86 with a socket 87 rigid therewith in which is rotatably mounted a ball 88. The ball has a bore through which extends a control rod 91, affixed at one end to the cross bar 65 on one side of the shaft 66 by means of a ball and socket joint 92. As is clearly shown, the portion of the control rod 91 adjacent the leg 86 of lever 85 has a pair of spaced stops 93 affixed thereon straddling the socket 87 and a pair of coil springs 94 encompassing the rod 91 are compressed between said stops and the socket 87. The springs 94 are desirably of considerable strength so that normally movement of the rod 91 through the bore of ball 88 will be restrained.

As is illustratively shown in the drawings, the two selector valves 26 and 29 are positioned one above the other and the control rod 101 of each of the valves is pivotally connected to an associated link 102 which in turn is pivotally connected to a pin 103 extending laterally outward from the lever 85. To support the lever 85, a slot 104, preferably horizontal, is provided in the supporting member 81 and a pin 105 rigidly affixed to the lever extends through such slot riding on its lower edge, the slot limiting the movement of such lever for the purpose hereinafter to be described.

In order that the position of the rudder may be indicated to the helmsman, a conventional position indicating transmitter 106 is mounted on the rudder shaft and connected through suitable leads to an indicator 107 positioned adjacent the steering wheel.

In the operation of the system shown in Fig. 1, the motors M are energized and consequently the fluid from reservoir 11 will be forced from the pumps 14 and 15 into the feed lines 18 and 19 respectively. As the selector valves 26 and 29 are closed at this time, being in neutral position, the high and low pressure accumulators 22 and 23 will charge. When the pressures in each of the accumulators has reached a predetermined value, the motors M will be de-energized through conventional pressure switches (not shown) and such motors will remain de-energized so long as the pressure in the associated accumulator is above a predetermined amount.

As the accumulator 22 is a high pressure unit and the accumulator 23 a low pressure unit, more power will be required to charge the high pressure accumulator than the low pressure accumulator. With the system herein described and shown, the low pressure accumulator is utilized during normal steering action and the high pressure accumulator is utilized only when sharp rapid turns are required, or if the low pressure unit should fail, or not be able to exert sufficient force to operate the rudder.

Assuming that the steering wheel 71 is turned slightly, say in the order of one or two degrees, the pump 72 will be actuated to force fluid through one of the lines 73 and 74 deepnding upon the direction of rotation of the steering wheel. Assuming that fluid under pressure is forced through line 73 into port 75 of hydraulic unit 77, the piston 78 therein will be moved to the right. As a result, the piston rod 82 will also be moved to the right pulling on pivot pin 84. As the lower end of the lever 85 is restrained from movement by the coil springs 94, the lever 85 will be pivoted about such lower end in a clockwise direction. As a result, the control rods 101 of the selector valves 26, 29 will be moved to the right toward one of their operating positions. As the upper end of the lever 85, to which the control rod 101 of low pressure valve 29 is connected, will move through a greater arcuate distance than the lower portion of the lever to which the control rod 101 of high pressure valve 26 is connected, the control rod 101 of the low pressure valve 29 will first reach one of its operating positions in which, in the illustrative example herein shown, its inlet port 28 is connected to its control port 43.

As a result of the actuation of valve 29, fluid under pressure will flow from the low pressure accumulator 23, through feed line 19, one-way valve 27, ports 28 and 43 of the low pressure selector valve 29, junction 46, lines 48 and 49 to the port 51 at the front end of hydraulic unit 52 and through lines 48 and 53 to the port 54 at the rear end of hydraulic unit 55.

As the result of the flow of fluid under pressure into the hydraulic units 52 and 55, the piston 62 of hydraulic unit 52 will be moved to the right and the piston 62 of the hydraulic unit 55 will be moved to the left. Consequently, the piston rod 63 of the hydraulic unit 52 will pull on the cross bar 65 and the piston rod 64 of the hydraulic unit 55 will push on the cross bar 65, thereby causing the shaft 66 and rudder 67 to rotate in a counter-clockwise direction.

It is to be noted that when the lever 85 was pivoted by the action of the hydraulic unit 77, as the pin 105 rides in the slot 104, the lever 85 will be lifted slightly, such movement being permitted by reason of the pivotal connection of the links 102 of the selector valves 26, 29; the pivotal mount of the hydraulic unit 77 and the ball and socket connection of the control rod 91 to the cross bar 65 of the rudder shaft 66 and to the leg 86 of lever 85.

The movement of the cross bar 65 due to the actuation of the hydraulic units 52 and 55 will cause the control rod 91 to be moved to the right from the position shown in Fig. 1. As a result, by reason of the springs 94, the lower end of the lever 85 will also be moved a corresponding amount to the right. As no fluid is now flowing into the hydraulic unit 77, inasmuch as the steering wheel is no longer being rotated, the piston rod 82 thereof will remain in set position and hence the lever 85 will rotate about the pivot pin 84 so that the upper end of the lever 85 will move in a counter-clockwise direction until the lever 85 is in neutral position. As the result of such movement, the control rods of selector valves 26 and 29 will be restored to their neutral position, the control rod of the low pressure selector valve 26 thus closing its ports to stop further flow of fluid and the rudder will remain in the desired set position. As the control rod of the selector valve 29 had not moved sufficiently to open the ports of this valve the movement of such control rod will have no effect.

If the steering wheel 71 should be turned through a considerable arc, that is, for example, an angle four or five degrees in the illustrative embodiment herein shown, as fluid under pressure flows into the port 75 of the hydraulic unit 77, the lever 85 will be pivoted a much greater amount about its lower end than it was when the steering wheel was turned only one or two degrees. As the rudder 67 will be restrained from rapid movement by reason of the action of the water thereagainst, the control rod 91 will have very little movement imparted thereto at this time and the lower end of the lever will also not initially be moved an amount sufficient to restore the lever 85 to neutral position. Consequently, the lever 85 will pivot sufficiently to move the control rod 101 of both selector valves 26 and 29 to open position so that both the low pressure and high pressure lines 19 and 18 are connected through the valves 29 and 26 to junction 46. As a result, in addition to the fluid under pressure flowing to the junction 46 from the low pressure accumulator, fluid under pressure will also flow from the high pressure accumulator 22, through feed line 18, one-way valve 24, ports 25 and 41 into junction 46. From such junction the fluid will flow through lines 48 and 49 to port 51 of hydraulic unit 52 and through lines 48 and 53 to port 54 of hydraulic unit 55. Consequently, such fluid under high pressure will now be available to effect more rapid movement of the rudder so that the latter will be moved to the desired position much more rapidly than could occur with It is of course to be noted that the fluid flowing from the ports 58 and 61 of the hydraulic units 52 and 55 will pass through lines 57, 59 and 56 into junction 47 and through ports 44, 32 and 42, 31 of the selector valves 26, 29 to junction 34 and thence through return line 35 to the reservoir 11.

As the rudder 67 moves to the desired position, the control rod 91, as previously described, will pivot the lever 85, first to restore the control rod 101 of the high pressure selector valve 26 to closed position so that the rudder will be moved to its desired final position only by the low pressure source and hence no overriding of the desired rudder setting will occur. Thereupon further movement of lever 85 by rod 91 will also move control rod 101 of the low pressure valve to closed position so that the system is ready for the next steering action by the steering wheel 71.

By reason of the slot 104 in which is positioned the pin 105 affixed to the lever 85, the movement of the lever 85 is restricted so that the movement of the control rods 101 of the selector valves will be limited, thereby preventing injury to such valves.

The coil springs 94 function in conventional manner to prevent injury to the lever 85, in the event of rapid and extreme displacement of the piston of hydraulic unit 77, due to the action of the steering wheel 71.

In the event that the low pressure source should be disabled, the helmsman upon turning the steering wheel 71 would notice that there was no corresponding indication on the position indicator 107. Consequently, he would merely turn the steering wheel 71 further, which would cause additional fluid to be pumped into the hydraulic unit 77 so that further pivotal movement would be imparted to the lever 85 to cause the high pressure selector valve 26 to be actuated.

The embodiment shown in Fig. 2 is substantially identical to that shown in Fig. 1 except that the hydraulic fluid supply has been modified and corresponding parts have the same reference numerals primed.

As shown in Fig. 2, the output of pump 14' is connected by line 121 through one-way valve 16' to junction 122 to which the high pressure line 18' is connected. Connected to line 121 between valve 16' and junction 122 is a high pressure accumulator 22' desirably of the type previously described and a conventional pressure switch 123 is connected by line 124 to said junction 122.

Connected to line 121 between pump 14' and valve 16' is a line 125 which leads through one-way valve 126 to the inlet port 127 of a pressure valve 128. The pressure valve 128 desirably comprises a cylindrical container 129 having a vent 130 in its end wall 131 and a port 132 in its opposed end. Slidably mounted in the container 129 is a piston 133 which desirably has a peripheral groove 134 in which an O ring seal 135 is positioned. The piston 133 is desirably retained against the end of the container 129 having the port 132 by means of a coil spring 136 compressed between the inner end of the piston and the end wall 131 of the container. The piston 133 is desirably splined in the container 129 so that it will not rotate therein and has a passageway 138 therethrough which, when the piston is in its normally seated position, as shown, will have one end 139 aligned with the port 127 and its other end 141 aligned with the port 132.

The port 132 is connected by line 142 to the port of a low pressure accumulator 23' also of the type previously described and such line 142 is connected by line 144 through one-way valve 145 to the low pressure line 19', which is also connected by line 146 to line 125.

The port 132 is also connected by line 147 to a conventional pressure switch 148, which is electrically connected in parallel with pressure switch 123 through suitable leads 149 to control the motor M'.

The system shown in Fig. 2 may have an emergency hand pump 151 having its inlet connected to the reservoir 11' by line 152 and its outlet connected to the low pressure line 19' by line 153, through a one-way valve 154.

To ready the system shown in Fig. 2 for operation, the motor M' is energized and fluid will be drawn from the reservoir 11' through line 12' and forced under pressure through valve 16' into the high pressure accumulator 22' to charge the latter. In addition, such fluid under pressure will be forced through valve 126 and line 125 into port 127 of the pressure valve 128, through passageway 138 and port 132, line 142 into the low accumulator 23' to charge the latter.

The pressure in the low pressure accumulator 23' will rise and when it reaches say, 1,500 p.s.i., the force of spring 136 will be overcome and the piston 133 will rise to seal the port 127. As the result, no further fluid under pressure will flow into the accumulator 23'. At this time also, the pressure switch 148 which is illustratively set to operate at 1,500 p.s.i. will be actuated to open its contacts. However, as the contacts of the pressure switch 123 are still closed, as they do not open until the pressure applied to switch 123 rises to 3,000 p.s.i., the motor M' will remain energized. Consequently, the pump 14' will still be driven to charge the high pressure accumulator 22'.

When the pressure in accumulator 22' rises to 3,000 p.s.i., the pressure switch 123 will then also be actuated to open its contacts and at this time, since the contacts of both pressure switches 123 and 148 are open, the motor M' will be de-energized.

The system shown in Fig. 2, thus fully charged, will then operate in identical manner to the system shown in Fig. 1. That is, fluid from the low pressure accumulator 23' will flow through lines 142, 144, valve 145 into the low pressure line 19' when the appropriate selector valve 29 (Fig. 1) is opened, in the manner described with respect to the embodiment of Fig. 1 and when the high pressure selector valve 26 (Fig. 1) is opened, also in the manner previously described, fluid under high pressure will flow through high pressure line 18' from the high pressure accumulator 22'.

As fluid under pressure is expelled from the low pressure accumulator 23' and the pressure therein gradually falls, when such pressure reaches say, 1400 p.s.i., at such time the piston 133 will be seated at the lower end of the container 129 and the passageway 138 will provide communication between lines 125 and 142. At such pressure of 1400 p.s.i., the pressure switch 148 will be actuated to close its contacts thereby energizing the motor M' to drive the pump 14'. As the fluid in accumulator 22' is under a pressure of say 3,000 p.s.i. at this time, the fluid from the pump will not flow through valve 16', but will pass through line 121, valve 126, line 125 to the port 127 of pressure valve 128, through passageway 138, port 132, line 142 to again charge the accumulator 23'. In the manner previously described, the pressure will rise until it reaches 1,500 p.s.i. at which time the piston 133 will rise to seal port 127 and the pressure switch 148 will again be actuated to open its contacts to de-energize the motor M'.

Assuming that in the operation of the system the pressure in the high pressure accumulator should have fallen to say 2,800 p.s.i., at such time the pressure switch 123 will close to energize the motor M'. As a result, fluid under pressure will be forced from the outlet of the pump 14', through one-way valve 16' to charge the accumulator 22'. As port 127 of valve 128 is closed by the piston 133, no fluid will flow in line 125. When the pressure in the accumulator 22' rises to 3,000 p.s.i., the pressure switch will again open to de-energize the motor.

In the event of failure of power, the hand operated pump 151 can be actuated by a crew member to supply fluid, under a relatively low pressure to the low pressure line 19' to operate the rudder.

The system shown in Fig. 3 is also substantially identical to that shown in Fig. 1 except that another modification of the hydraulic fluid supply is illustrated and parts corresponding to those in Fig. 1 have the same reference numerals primed.

As shown in Fig. 3, the output of pump 14' is connected by line 161 through one-way valve 16' to junction 162 to which the high pressure line 18' is connected. Connected to line 161 between valve 16' and junction 162 is a high pressure accumulator 22' also of the type previously described and a conventional pressure switch 163 is connected by line 164 through a restricted orifice 165 therein which is desirably adjustable as shown, to said junction 162.

Connected to line 161 between pump 14' and valve 16' is a line 166 which leads through one-way valve 167 to low pressure line 19'. Line 165 also is connected by line 168 through a restricted orifice 169, also adjustable, as shown, to pressure switch 163.

In the system shown in Fig. 3, when motor M' is energized, fluid will be drawn from reservoir 11' and forced under pressure through valve 16' into the high pressure accumulator 22' to charge the latter. As the selector valves 26 and 29, shown in Fig. 1 controlling the high pressure line 18' and low pressure line 19' are closed, no fluid will flow in such lines. As the accumulator charges, the pressure in line 164 will also rise and when such pressure reaches a value of say 3,000 p.s.i., the pressure switch 163 will be actuated to open its contacts and cut off the motor M'.

When the selector valve 29 controlling the low pressure line 19' is opened there will be a flow of fluid under pressure from the pressure accumulator 22', orifice 165, line 164, orifice 169, line 168, valve 167 into the low pressure line 19'.

Due to such restricted orifices 165, 169, the pressure in the low pressure line will be below the maximum pressure available in the high pressure accumulator and the pressure in such line 19' may be set by adjusting orifices 165, 169.

As the pressure in line 164 falls with flow of fluid through line 19', when it falls to say 2,900 p.s.i., the pressure switch 163 will be actuated to close its contacts, thereby energizing the motor M' to drive pump 14'. Consequently, fluid will then be forced from the pump 14', through lines 161, 166 and valve 167 into the low pressure line 19'. The pump 14' is designed to supply the quantity of fluid required under a relatively low pressure to move the rudder to the desired position.

As the pump is actuated, fluid will also be forced through valve 16' to the high pressure accumulator 22'. However, as the fluid finds an easier path of travel through the low pressure line 19' at this time, the high pressure accumulator will not be charged and it will only be charged when fluid no longer flows through the low pressure line 19'. At such time the high pressure accumulator will be charged until it has attained a pressure of 3,000 p.s.i. at which time the pressure switch will again open to shut off the motor.

Thus, under normal operation when only the low pressure line 19' is open, the pump 14' will be driven to supply fluid, and only when the high pressure line 18' is opened by the actuation of the associated selector valve 26, as previously described with respect to the embodiment shown in Fig. 1, will fluid flow from the high pressure accumulator 22' into the high pressure line to actuate the hydraulic cylinders controlling the rudder.

In the embodiment shown in Fig. 4, a single selector valve 172 is used to control both the low pressure and high pressure line. The valve 172 which may replace the selector valves 26 and 29, shown in Fig. 1, may be mounted on the supporting panel 81 shown in such figure and has its control rod 173 connected by link 174 to the upper end of the lever 85'. Thus, upon movement of the lever 85' in the manner described with respect to the embodiment shown in Fig. 1, the control rod 173 of the valve 172 will be moved correspondingly.

The valve 172 desirably comprises a body 174 having a substantially cylindrical bore 175 in which is slidably mounted the control rod 173. The valve body has a plurality of passageways leading thereinto, illustratively six in the embodiment herein shown. The passageways 181 and 182 are connected to ports 183 and 184 in the valve body which define control ports and which are connected to the control ports 51, 54 and 58, 61 respectively of the hydraulic cylinders 52 and 55 in the same manner as those in the embodiment shown in Fig. 1.

In addition to the control ports 183 and 184, the valve body has three inlet ports 185, 186 and 187 which are connected to associated passageways 188, 189 and 191 leading into the bore 175 of the valve body. The valve body also has a return port 192 having an associated passageway 193 also leading into the bore of the valve body 174.

The return port 192 is connected by a suitable line to the fluid reservoir 11 (Fig. 1). The inlet ports 185 and 187 are connected by line 194 to the high pressure line 18 and the inlet port 186 is connected by line 195 to the low pressure line 19. The control rod 173 shown in Fig. 4 has three spaced annular grooves 196, 197 and 198 in its periphery. In the neutral position of the control rod shown in Fig. 4, the inlet ports 185 and 187 and the control ports 183 and 184 are sealed, the return port 192 at such time being connected to annular groove 198 which, as shown, is connected to annular groove 196 by means of a passageway 201 in the control rod. At such time, the inlet port 186 is connected through passageway 189 to the annular groove 197.

The valve body in addition to the passageways associated with the various ports, has two additional passageways 202 and 203 connected at one end to passageways 181 and 182 respectively and leading at their other ends into the bore 175 of the valve body. Such passageways 202 and 203 are also sealed by the control rod when the latter is in the neutral position shown.

When the control rod is moved sufficiently to the left from the position shown in Fig. 4, so that the ports 185 and 187 are still sealed, and the port 183 is opened, the port 186 will be connected through a passageway 189 and groove 197 with port 183. As a result, fluid will flow from the low pressure line through port 183 to actuate the hydraulic units 52, 55 (Fig. 1) and the fluid from such hydraulic units will flow through bore 184, passageways 182, 203, groove 198, passageway 193 and bore 192 to the reservoir.

In the event the lever 85' is moved a greater amount, as described with respect to the embodiment shown in Fig. 1, such as when the steering wheel 71 is turned a greater amount or if the rudder should not move freely, and such movement of lever 85' moves the control rod 173 sufficiently to the left to bring passageway 188 into communication with annular groove 197, as passageway 191 is still sealed, fluid under high pressure will flow through passageway 188, annular groove 197, passageway 181 and control port 183 into the hydraulic units to effect the desired movement of the rudder and the fluid from such hydraulic units would flow into control port 184, passageways 182, 203, annular groove 198, passageway 193, through port 192 to the reservoir.

A similar action, as above described, would occur with movement of the lever 85' and the control rod 173 to the right in which case fluid under pressure would flow through port 184 and be returned into port 183. The fluid returned into port 183 would flow through passageways 181 and 202, groove 196, passageway 201, groove 198, passageway 193 and port 192 to the reservoir.

It is apparent that with the construction shown in Fig. 4 a single valve may replace the two selector valves shown in Fig. 1 and the resultant unit would of course be more compact which in certain applications may be desirable.

In the embodiment shown in Fig. 5 which is similar in many respects to that shown in Fig. 1, corresponding parts have the same reference numerals primed. In this embodiment the fluid under low pressure is supplied by means of a variable delivery pump 211 of conventional type such as that put out by the American Engineering Company. The pump 211 has a rod 212 which controls the operation of such pump, so that as the rod is moved, the pump output will flow through one of its ports 213, 214 and suction will be created in the other of its ports. As the rod 212 is moved from the neutral position shown, to either the left or to the right, the output will go from zero to maximum. Thus, the ports 213 and 214 will alternately be discharge and suction ports.

The rod 212 is connected by a link 215 to the upper end of the lever 85' in the manner similar to the connection of the link 102 of the selector valve 29 (Fig. 1). The port 213 of the pump 211 is connected by lines 216 and 217 through one-way valve 218 and pressure relief valve 219 to line 220 and to reservoir 11'.

In addition, the port 213 is connected through line 216 and 221 to the ports 225, 226 and 227 of a pressure valve 228, a one-way valve 229 being positioned in line 221 between ports 225 and 226. The valve 228 has a piston 231 slidably mounted therein and normally urged by a coil spring 232 toward the end 233 of the valve, a stop 234 desirably carried by the piston spacing the end of the latter from said valve end 233.

The piston has an annular groove 235 which provides communication between ports 225 and 226 when the stop 234 is against end 233 of the valve, the port 227 being in open position at such time and an additional port 236 of the valve being closed by the end 237 of the piston.

The line 221 is connected by line 241 to the control port 41' of a high pressure selector valve 26' and by line 242 to the port 51' of the hydraulic unit 52'. The port 58' of unit 52' is connected by lines 243 and 244 to port 42' of selector valve 26'; by lines 243 and 245 to ports 225', 226' and 227' of a pressure valve 228' identical to valve 228 and through one-way valve 246 to port 214 of the pump, the line 245 also being connected by line 251 through pressure valve 252 and one-way valve 253 to line 220, which leads to the reservoir 11' and to which port 236 and 236' of valves 228 and 228' are also connected by line 255.

The inlet port 25' of selector valve 26' is connected by line 256 to line 257 between the port 258 of the high pressure accumulator 22' and the output of pump 14', a one-way valve 16' being provided in such line. The discharge port 31' of the valve 26' is connected by line 259 to the reservoir 11'.

When the lever 85' is in its normal neutral position, the pump 211 will also be in neutral position and though it is being continuously driven by a suitable motor (not shown) no fluid will be forced or sucked from either of the ports 213 or 214. When the pump 14' is actuated, fluid will be forced from the reservoir 11', through one-way valve 16' into the accumulator 22' to charge the latter, and when such pressure has attained a predetermined amount, a pressure switch (not shown) will be actuated to stop the pump 14'.

When the steering wheel 71 shown in Fig. 1 is actuated to cause the lever 85' to be moved under the force exerted by the hydraulic unit 77', if the lever 85' is moved only a small amount by reason of a slight rotation of the steering wheel, the control rod 212 of the pump 211 will, as it is first moved a small amount, cause fluid under pressure to flow say through port 213, lines 216, 221 and 242 into the port 51' of the hydraulic unit 52' to actuate the rudder in the manner previously described. The fluid from port 58' will flow through lines 243, 245, through port 226', groove 235' of valve 228' and port 225' to port 214 of the pump 211. The movement of the control rod 91', as described with respect to Fig. 1, will thereupon reset the lever 85' so that the pump control rod 212 will set the pump 211 to neutral position so that no further fluid will flow therefrom. The rotation of the pump 211 will suck fluid from the reservoir 11' through one-way valve 253 into port 214 and in the event that the pressure should rise in line 216 above a predetermined amount, the relief valve 219 will open for discharge of such fluid.

It is of course to be understood that if the lever 85' is moved in the opposite direction the port 214 will be the discharge port and the port 213 will be the suction port and the function of the equipment will be as previously described.

In the event that the rudder should be difficult to turn or considerable movement is desired, the high pressure valve 26' will be operated by the lever 85' in the manner described with respect to the embodiment shown in Fig. 1. As a result, fluid under such high pressure will flow from the accumulator 22', through line 256, ports 25', 41' of the selector valve, lines 241 and 242 to port 51' to actuate the hydraulic unit 52' to turn the rudder. In addition, there will be high pressure applied to the piston 231 of the valve 228 through port 227 and such piston will move upwardly to close port 226 so that the fluid under high pressure will not be forced into the pump 211 with possible injury thereto. The fluid from pump 211 will flow through line 221, ports 225, 226 which are now connected by groove 235 of valve 228 and line 255 to reservoir 11'. The fluid forced from the port 58' of hydraulic unit 52' will flow through lines 243 and 244, ports 42', 31' of selector valve 26' and line 259 to the reservoir 11'.

It is of course apparent that although the pump 211 is still rotating and is not in a neutral position, though fluid will still be forced through the port 213, such fluid will discharge into the reservoir so that the pump will work in a closed loop at such time, sucking fluid from the reservoir and discharging it back to the same.

It is apparent from the foregoing that the pump 211 functions in the same manner as the low pressure selector valve 29' (Fig. 1) hence no further description is deemed necessary.

With the system shown in Fig. 5, in neutral position, in the event that a wave should strike the rudder in direction to turn the cross bar 65' in a counterclockwise direction, for example, the rod 91' will be moved to the right to rotate the upper end of lever 85' in a counterclockwise direction. As a result, the ports 25' and 42' of the valve 26' will be connected and the fluid in cylinder 52' will be forced under pressure through port 58', lines 243 and 244, ports 42', 25' and line 256 into accumulator 22' to charge the latter. As such fluid under pressure will also flow into port 227' of valve 228', it will move the piston 231' thereof upwardly to seal port 226' so that no fluid will flow into port 214 of the pump 211 which might injure the latter.

When the shock of the wave against the rudder has stopped, as valve 26' is still open, the fluid under pressure forced into the accumulator will flow back into port 58' to reset the rudder to its normal position at which time valve 26' will again close and piston 231' will move to its normal position.

Thus, automatic recharging of the accumulator 22' without need for electrical power to drive the pump 14' is provided, as is automatic resetting of the rudder.

It is of course to be understood that any of the hydraulic fluid supplies shown and described in Figs. 1, 2, 3 and 4 could be used to actuate the rudder in combination with either the selector valves shown in Fig. 1 or the valve shown in Fig. 4.

The availability of the high pressure source in addition to insuring that rapid movement may be imparted to the rudder when considerable angular displacement thereof is required, also will permit high pressure and consequently great force to be applied in the event that the ship, for example, is traveling through heavy seas or stormy weather which causes twisting and turning of the ship and consequent slow response due to strong currents against the rudder and also if the ship is traveling through ice which might impede the free rotation of the rudder under low pressure and the high pressure supply available would in all probability permit movement of the rudder.

In addition to the foregoing, as under most operations, only low pressure is required, the power requirement for providing the desired pressure is reduced with consequent great saving which is of course desirable.

As many changes could be made in the above system and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A hydraulic system of the character described comprising a first and second source of fluid under pressure, a hydraulically controlled member having a movable element capable of actuation by either of said pressure sources, means associated with each of said sources to control the flow of fluid therefrom to said hydraulically controlled member, means successively to actuate said control means to connect first one and then the other of said sources to the hydraulically controlled member, whereby both of said sources will be connected thereto, means operatively connected to the means to actuate the control means and controlled by the movement of the movable element of said hydraulically controlled member, successively to deactuate said control means, said sources of fluid under pressure comprising a pump having an inlet for connection to a fluid supply and an outlet, a motor to drive said pump, a pressure accumulator, a line connecting said outlet to said pressure accumulator for charging of the latter, a pressure switch operatively connected to said accumulator and electrically connected to said motor, a one-way valve in the line between said outlet and said pressure accumulator, a pressure valve having an inlet port and an outlet port normally in communication, a line connecting said inlet port to the line between the pump and said check valve, a check valve in said second line, a second pressure accumulator, a line connecting said outlet port to said second pressure accumulator, a second pressure switch connected in parallel with said first pressure switch and operatively connected to said second pressure accumulator, a line having a check valve therein, connecting said line between said outlet port and said second pressure accumulator to the line leading to said inlet port, and means to connect each of said pressure accumulators to the associated control means.

2. A hydraulic system of the character described comprising a first and second source of fluid under pressure, a hydraulically controlled member having a movable element capable of actuation by either of said pressure sources, means associated with each of said sources to control the flow of fluid therefrom to said hydraulically controlled member, means successively to actuate said control means to connect first one and then the other of said sources to the hydraulically controlled member, whereby both of said sources will be connected thereto, means operatively connected to the means to actuate the control means and controlled by the movement of the movable element of said hydraulically controlled member, successively to deactuate said control means, said sources of fluid under pressure comprising a pump having an inlet for connection to a fluid supply and an outlet, a motor to drive said pump, a pressure accumulator, a line having a one-way valve therein connecting said outlet to said pressure accumulator for charging of the latter, a pressure switch having an inlet and electrically connected to said motor, a line having a restricted orifice therein connecting said pressure accumulator to the inlet of said pressure switch, a line having a restricted orifice therein connected to the inlet of said pressure switch and to the outlet of said pump and lines to connect the outlet of the pressure accumulator and the outlet of the pump to the associated control means.

3. A hydraulic system of the character described comprising a first and second source of fluid under pressure, a hydraulically controlled member having a movable element capable of actuation by either of said pressure sources, means associated with each of said sources to control the flow of fluid therefrom to said hydraulically controlled member, one of said control means comprising a selector valve having a neutral position and two operating positions and one of said sources of fluid under pressure having the other control means associated therewith being a variable delivery pump, means successively to actuate said control means to connect first one and then the other of said sources to the hydraulically controlled member, whereby both of said sources will be connected thereto, and means operatively connected to the means to actuate the control means and controlled by the movement of the movable element of said hydraulically controlled member, successively to deactuate said control means.

4. A hydraulic system of the character described comprising a hydraulically controlled member having a movable element, a first and second source of fluid under pressure to actuate the movable element of said hydraulically controlled member, valve means associated with each of said sources to control the flow of fluid therefrom to said hydraulically controlled member, a lever pivotally mounted near one end and movable from a neutral position to either of two operating positions, said valve means each having a control element operatively connected to said lever near its other end at longitudinally displaced locations thereon, whereby upon pivotal movement of said lever from neutral position to one of said operating positions, the control element closest to said other end of the lever will be displaced a greater amount than the other control element, for successive actuation of said valves to connect first one and then the other of said sources to the hydraulically controlled member and means operatively connected to said lever and controlled by the movement of the movable member of said hydraulically controlled member to move said lever back to neutral position to deactuate said valve means in reverse order to their actuation.

5. The combination set forth in claim 4 in which means are provided operatively connected to said lever between its pivotal mount and the connection of the control elements thereto to pivot said lever about its pivotal mount.

6. The combination set forth in claim 4 in which the lever is pivotally mounted to the means operatively connected thereto and controlled by the movement of the movable element of said hydraulically controlled member.

7. The combination set forth in claim 4 in which the lever is pivotally mounted to the means operatively connected thereto and controlled by the movement of the movable element of said hydraulically controlled member and actuating means are pivotally connected to said lever between its pivotal mount and the connection of the control elements thereto to pivot said lever about its pivotal mount.

8. The combination set forth in claim 7 in which the actuating means comprises a hydraulically actuated unit having a piston rod and said piston rod is pivotally connected to said lever.

9. The combination set forth in claim 4 in which the means operatively connected to the lever and controlled by the movement of the movable element of the hydraulically controlled member is a rod and said lever is pivotally and slidably mounted with respect to said rod, resilient means are provided normally to restrain sliding movement of said lever with respect to said rod and actuating means are pivotally connected to said lever between its pivotal mount and the connection of the control elements thereto to pivot said lever about its pivotal mount.

10. A hydraulic system of the character described comprising a hydraulically controlled member having a movable element, a first source of fluid under pressure comprising a pump having associated valve means having a closed position and two operating positions to provide a variable delivery output to said hydraulically controlled member, a second source of fluid under pressure comprising a pressure accumulator and means to charge said accumulator, a selector valve having a closed position and two operating positions to control flow of fluid from said second source of fluid to said hydraulically controlled member, a fluid supply for said sources, means successively to actuate the respective valve means to connect said first pump and then said accumulator to said hydraulically actuated unit and means operatively connected to the means to actuate the valve means and controlled by the movement of the movable element of said hydraulically controlled member, successively to deactuate the valve means.

11. The combination set forth in claim 10 in which said three-way selector valve has an inlet port connected to said accumulator, a discharge port connected to said fluid supply and two control ports and the hydraulically controlled member has a piston to which the movable element is connected and a pair of ports respectively positioned on each side of said piston and connected to said control ports, said pump has a pair of ports connected to the ports of said hydraulically controlled member and pressure valve means are connected to each of the ports of the pump and to the fluid supply to by-pass the fluid from said pump to the fluid supply when the pressure on the fluid supplied to the hydraulically controlled member from the accumulator rises above a predetermined amount.

12. The combination set forth in claim 11 in which a line connects each of the pump ports to the control ports of the hydraulically controlled member and each of the pressure valve means comprises a cylinder having a discharge port connected to the fluid supply and three additional ports all connected to the associated line, said cylinder having a piston slidable therein normally urged to seal the discharge port, said piston having an annular groove normally providing communication between two adjacent ports, a one-way valve in the line between said two adjacent ports to prevent flow of fluid from the control port of the hydraulically controlled member to the pump, the third port being in communication with the associated control port of the hydraulically controlled member and designed to direct fluid against the piston to move the latter when the pressure on the fluid is of predetermined value, to close one of the two adjacent ports and connect the other of said two ports to the discharge port.

13. The combination set forth in claim 10 in which a line connects each of said pump ports to said fluid supply, each of said lines having a one-way valve therein for flow of fluid from the fluid supply to the pump port and a pressure relief valve by-passing said one-way valve for flow of fluid to the fluid supply.

14. A selector valve comprising a body portion having a pair of control ports, a discharge port and three inlet ports, said valve including slidable means to seal said control ports and upon movement of said means in one direction, to connect one of said control ports to said discharge port while successively connecting first one of said inlet ports to the other of said control ports and then the second of said inlet ports to said other control port and when moved in the opposite direction to connect said other control port to the discharge port while successively connecting the first of said inlet ports to the first control port and the third of said inlet ports to said first control port.

References Cited in the file of this patent

UNITED STATES PATENTS

| | | |
|---|---|---|
| 66,093 | Leach | June 25, 1867 |
| 1,056,194 | Martineau | Mar. 18, 1913 |
| 1,353,656 | Heisler | Sept. 21, 1920 |
| 1,970,530 | West | Aug. 14, 1930 |
| 2,051,052 | Morgan | Aug. 18, 1936 |
| 2,512,119 | Stone | June 20, 1950 |
| 2,583,197 | Armington | Jan. 22, 1952 |
| 2,614,644 | Gustafson | Oct. 21, 1952 |
| 2,624,283 | Hirvonen | Jan. 6, 1953 |

FOREIGN PATENTS

| | | |
|---|---|---|
| 241,234 | Great Britain | Oct. 12, 1925 |